US012482423B2

(12) United States Patent
Jung

(10) Patent No.: US 12,482,423 B2
(45) Date of Patent: Nov. 25, 2025

(54) PIXEL CIRCUIT AND DISPLAY DEVICE INCLUDING SAME

(71) Applicant: LG Display Co., Ltd., Seoul (KR)

(72) Inventor: Do Young Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/830,083

(22) Filed: Sep. 10, 2024

(65) Prior Publication Data

US 2025/0218360 A1 Jul. 3, 2025

(30) Foreign Application Priority Data

Dec. 29, 2023 (KR) ........................ 10-2023-0195990

(51) Int. Cl.
*G09G 3/3233* (2016.01)

(52) U.S. Cl.
CPC ....... *G09G 3/3233* (2013.01); *G09G 2310/08* (2013.01); *G09G 2320/0673* (2013.01); *G09G 2330/023* (2013.01)

(58) Field of Classification Search
CPC ............. G09G 3/3233; G09G 2310/08; G09G 2320/0673; G09G 2330/023
See application file for complete search history.

(56) References Cited

U.S. PATENT DOCUMENTS

| | | | | |
|---|---|---|---|---|
| 12,008,965 | B2 | 6/2024 | Jung et al. | |
| 2022/0101798 | A1 | 3/2022 | Jung et al. | |
| 2024/0321208 | A1* | 9/2024 | Lee | G09G 3/3233 |
| 2025/0029561 | A1* | 1/2025 | Liu | G09G 3/20 |
| 2025/0148979 | A1* | 5/2025 | Kim | G09G 3/32 |

FOREIGN PATENT DOCUMENTS

| | | | |
|---|---|---|---|
| KR | 10-2017-0015748 | A | 2/2017 |
| KR | 10-2018-0003380 | A | 1/2018 |
| KR | 10-2022-0042843 | A | 4/2022 |

* cited by examiner

*Primary Examiner* — Benjamin C Lee
*Assistant Examiner* — Nathan P Brittingham
(74) *Attorney, Agent, or Firm* — Fenwick & West LLP

(57) ABSTRACT

A pixel circuit includes a driving element including a first electrode connected to a first node, a gate electrode connected to a second node, and a second electrode connected to a third node; a first switch element supplying a pixel driving voltage to the first node; a second switch element connecting a fourth node to the second node; a third switch element supplying a data voltage to the second node; a fourth switch element supplying a reference voltage to the second node; a fifth switch element connecting the fourth node to the third node; a first capacitor connected to the second node and the third node; a second capacitor connected to a first power line and the fourth node; and a light-emitting element connected to the third node and a second power line.

16 Claims, 17 Drawing Sheets

PIXEL CIRCUIT AND DISPLAY DEVICE INCLUDING SAME

CROSS-REFERENCE TO RELATED APPLICATION

This application claims the priority from Republic of Korea Patent Application No. 10-2023-0195990, filed on Dec. 29, 2023, which is hereby incorporated by reference in its entirety.

BACKGROUND

Field

The present disclosure relates to a pixel circuit and a display device including the same.

Description of Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device includes an organic light emitting diode (hereinafter referred to as an "OLED") which emits light by itself, and has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a gate signal, such as a scan signal and emission signal to the display panel, and a data driver that supplies a data signal to the display panel.

SUMMARY

Each of a plurality of pixels includes a driving element that controls a driving current flowing in an OLED according to the voltage (Vgs) applied between a gate electrode and a source electrode. The electrical characteristics of the driving element deteriorate over driving time and may vary for each pixel. Therefore, the organic light-emitting display device compensates for the deterioration of the driving element through internal compensation technology or external compensation technology.

The internal compensation technology senses the threshold voltage (Vth) of the driving element for each sub-pixel by using an internal compensation circuit embedded in each pixel and compensates for the gate-source voltage (Vgs) of the driving element by the threshold voltage.

This gate-source voltage (Vgs) of the driving element affects a gamma curve for gray scale expression, and due to the gamma curve, power consumption may increase or low gray scale expression may be difficult.

The present disclosure is directed to solving all the above-described necessity and problems.

The present disclosure provides a pixel circuit and a display device including the same.

It should be noted that objects of the present disclosure are not limited to the above-described objects, and other objects of the present disclosure will be apparent to those skilled in the art from the following descriptions.

A pixel circuit according to embodiments of the present disclosure may include a driving element including a first electrode connected to a first node of the pixel circuit, a gate electrode connected to a second node of the pixel circuit, and a second electrode connected to a third node of the pixel circuit; a first switch element supplying a pixel driving voltage to the first node in response to a first gate signal; a second switch element connecting a fourth node of the pixel circuit to the second node in response to a second gate signal; a third switch element supplying a data voltage to the second node in response to a third gate signal; a fourth switch element supplying a reference voltage to the second node in response to a fourth gate signal; a fifth switch element connecting the fourth node to the third node in response to the third gate signal; a first capacitor connected to the second node and the third node; a second capacitor connected to a first power line of the pixel circuit and the fourth node; and a light-emitting element connected to the third node and a second power line of the pixel circuit.

A display device according to embodiments of the present disclosure may include a display panel including a plurality of data lines, a plurality of gate lines that cross the plurality of data lines, and a plurality of pixel circuits, each of the plurality of pixel circuits includes a driving element including a first electrode connected to a first node, a gate electrode connected to a second node, and a second electrode connected to a third node; a first switch element supplying a pixel driving voltage to the first node in response to a first gate signal; a second switch element connecting a fourth node to the second node in response to a second gate signal; a third switch element supplying a data voltage to the second node in response to a third gate signal; a fourth switch element supplying a reference voltage to the second node in response to a fourth gate signal; a fifth switch element connecting the fourth node to the third node in response to the third gate signal; a first capacitor connected to the second node and the third node; a second capacitor connected to a first power line and the fourth node; and a light-emitting element connected to the third node and a second power line.

The present disclosure uses a capacitor with a large capacity by further including two switch elements for selectively connecting a capacitor for writing data voltage to the gate electrode and the source electrode of the driving element, without adding a capacitor, so it is possible to improve gamma characteristics in low gray scales.

According to the present disclosure, in the threshold voltage sensing of the driving element, the voltage charging speed of the source node is increased, and this can shorten the sensing time.

According to the present disclosure, the driving element with a dual gate structure may be advantageous for high-resolution and high-refresh rate driving by reducing the time required for sensing the threshold voltage of the driving element.

According to the present disclosure, the data voltage for high luminance output may be reduced, thereby reducing the current stress on the driving element, and improving not only the lifespan of the element but also its reliability.

According to the present disclosure, the data voltage for high luminance output may be reduced and thus power consumption may be reduced.

The effects of the present specification are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing embodiments thereof in detail with reference to the attached drawings, in which.

DETAILED DESCRIPTION

Figure 1:
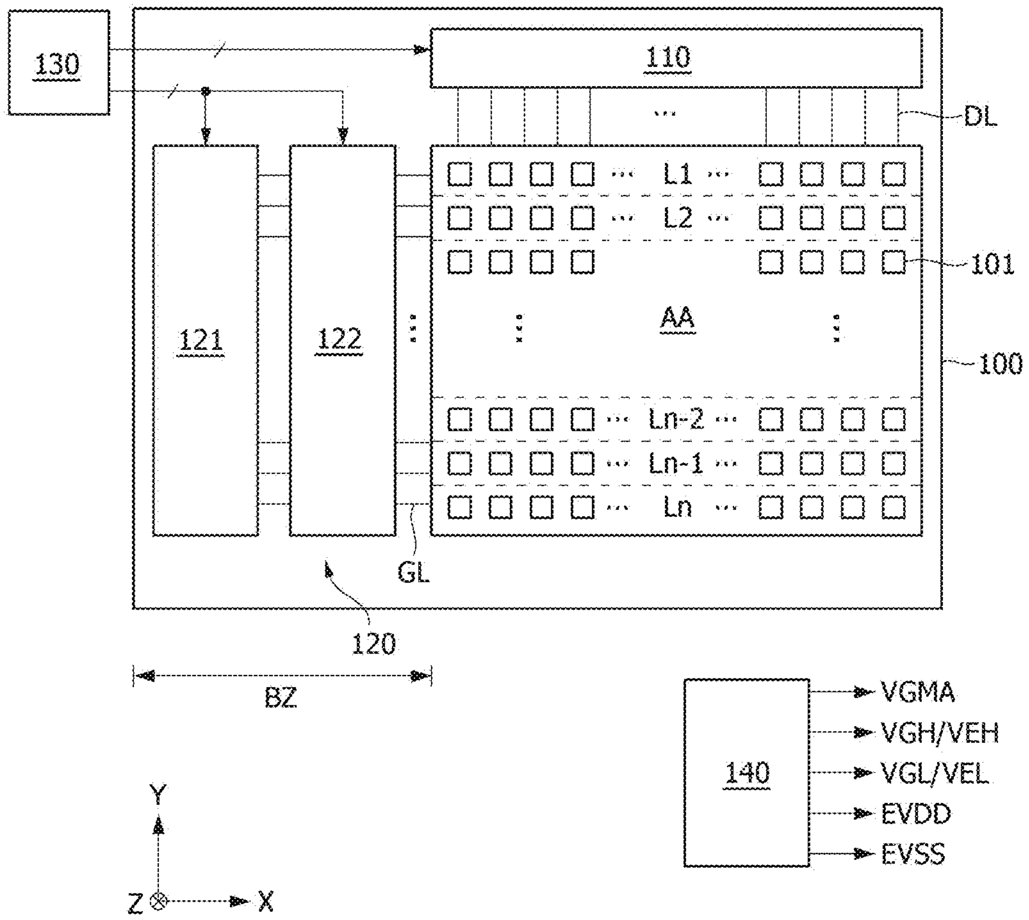
FIG. 1 is a block diagram showing a display device according to one or more embodiments of the present disclosure.

Advantages and features of the present disclosure and methods of achieving them will become apparent with reference to preferable embodiments, which are described in detail, in conjunction with the accompanying drawings. However, the present disclosure is not limited to the embodiments to be described below and may be implemented in different forms, the embodiments are only provided to completely disclose the present disclosure and completely convey the scope of the present disclosure to those skilled in the art, and the present disclosure is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of related known technology may unnecessarily obscure the gist of the present disclosure, the detailed description thereof will be omitted.

When 'including,' 'having,' 'comprising,' and the like mentioned in the present specification are used, other parts may be added unless 'only' is used. A case in which a component is expressed in a singular form includes a plural form unless explicitly stated otherwise.

In interpreting the components, it should be understood that an error range is included even when there is no separate explicit description.

In the case of a description of a positional relationship, for example, when the positional relationship of two parts is described as 'on,' 'at an upper portion,' 'at a lower portion,' 'next to, and the like, one or more other parts may be located between the two parts unless 'immediately' or 'directly' is used.

Although first, second, and the like are used to describe various components, these components are not limited by these terms. These terms are only used to distinguish one component from another. Accordingly, a first component, which is mentioned, below may also be a second component within the technical spirit of the present disclosure.

The same reference numerals may refer to substantially the same elements throughout the present disclosure.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

Figure 2:
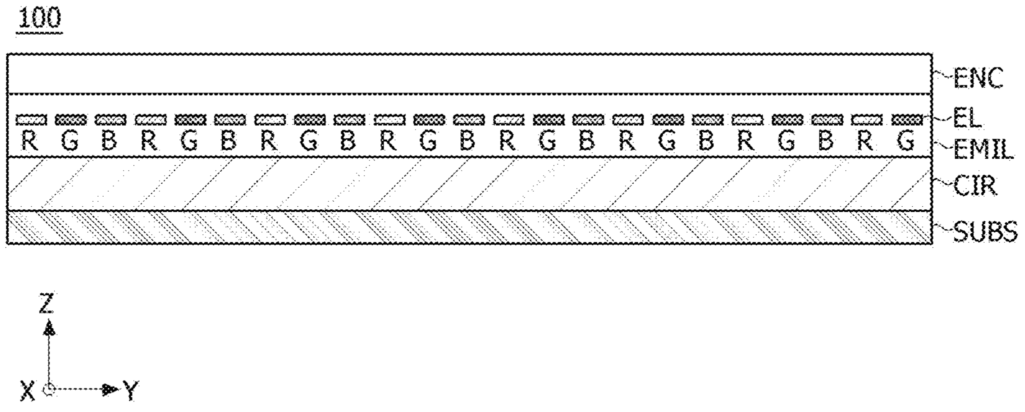
FIG. 2 is a cross-sectional view showing the cross-sectional structure of the display panel shown in FIG. 1 according to one or more embodiments of the present disclosure.

FIG. 1 is a block diagram illustrating a display device according to one or more embodiments of the present disclosure, and FIG. 2 is a cross-sectional view illustrating a cross-sectional structure of the display panel shown in FIG. 1 according to one or more embodiments of the present disclosure.

Referring to FIGS. 1 and 2, a display device according to one or more embodiments of the present disclosure includes a display panel 100, a display panel driving unit configured to write pixel data to pixels of the display panel 100, and a power supply unit 400 configured to generate power required for driving the pixels and the display panel driving unit.

The display panel 100 includes a pixel array AA that displays an input image. The pixel array AA includes a plurality of data lines DL, a plurality of gate lines GL intersected with the data lines DL, and pixels arranged in a matrix form.

The pixel array AA includes a plurality of pixel lines L1 to Ln. Each of the pixel lines L1 to Ln includes one line of pixels arranged along a line direction X in the pixel array AA of the display panel 100. Pixels arranged in one pixel line share the gate lines GL. Sub-pixels arranged in a column direction Y along a data line direction share the same data line DL. One horizontal period 1H is a time obtained by dividing one frame period by the total number of pixel lines L1 to Ln.

Touch sensors may be disposed on the display panel 100. A touch input may be sensed using separate touch sensors or may be sensed through pixels. The touch sensors may be disposed as an on-cell type or an add-on type on the screen of the display panel or implemented as in-cell type touch sensors embedded in the pixel array AA.

The display panel 100 may be implemented as a flexible display panel. The flexible display panel may be made of a plastic OLED panel. An organic thin film may be disposed on a back plate of the plastic OLED panel, and the pixel array AA may be formed on the organic thin film.

The back plate of the plastic OLED may be a polyethylene terephthalate (PET) substrate. The organic thin film is formed on the back plate. The pixel array AA and a touch sensor array may be formed on the organic thin film. The back plate blocks moisture permeation so that the pixel array AA is not exposed to humidity. The organic thin film may be a thin Polyimide (PI) film substrate. A multi-layered buffer film may be formed of an insulating material (not shown) on the organic thin film. Lines may be formed on the organic thin film so as to supply power or signals applied to the pixel array AA and the touch sensor array.

To implement color, each of the pixels may be divided into a red sub-pixel (hereinafter referred to as "R sub-pixel"), a green sub-pixel (hereinafter referred to as "G sub-pixel"), and a blue sub-pixel (hereinafter referred to as "B sub-pixel"). Each of the pixels may further include a white sub-pixel. Each of the sub-pixels 101 includes a pixel circuit. The pixel circuit is connected to the data line DL and the gate line GL.

The cross-sectional structure of the display panel 100 may include a circuit layer CIR, a light-emitting element layer EMIL, and an encapsulation layer ENC stacked on a substrate SUBS, as shown in FIG. 2.

The circuit layer CIR may include a thin-film transistor (TFT) array including a pixel circuit connected to wirings such as a data line, a gate line, a power line, and the like, and a gate driver 410 and 420. The circuit layer CIR includes a plurality of metal layers insulated with insulating layers interposed therebetween, and a semiconductor material layer. All transistors formed in the circuit layer CIR can be implemented as n-channel oxide TFTs.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. The light-emitting element layer EMIL corresponding to each of the sub-pixels may have a structure in which a light-emitting element and a color filter are stacked. The light-emitting elements EL in the light-emitting element layer EMIL may be covered by multiple protective layers including an organic film and an inorganic film.

The encapsulation layer ENC covers the light-emitting element layer EMIL to seal the circuit layer CIR and the light-emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively blocked.

A touch sensor layer (not shown) may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may have metal wiring patterns and insulating films that form the capacitance of the touch sensors. The insulating films may insulate an area where the metal wiring patterns intersect and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded together. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The power supply unit 400 generates direct current (DC) power necessary to drive the display panel driving unit and the pixel array of the display panel 100 by using a DC-DC converter. The DC-DC converter may include a charge pump, a regulator, a buck converter, a boost converter, and the like. The power supply unit 600 may adjust a level of an input DC voltage applied from a host system (not shown) to generate constant voltages (or DC voltages) such as a gamma reference voltage VGMA, gate-on voltages VGH and VEH, gate-off voltages VGL and VEL, the pixel driving voltage EVDD, the low-potential power voltage EVSS, the initialization voltage VINIT, and the reference voltage VREF. The gamma reference voltage VGMA is supplied to a data driver 110. The gate-on voltages VGH and VEH and the gate-off voltages VGL and VEL are supplied to a gate driver 120. The constant voltages such as the pixel driving voltage EVDD, the low-potential power voltage EVSS, the initialization voltage VINIT, and the reference voltage VREF are commonly supplied to the pixels.

The display panel driving unit writes pixel data of an input image to the pixels of the display panel 100 under control of a timing controller (TCON) 130.

The display panel driving unit includes the data drivers 110 and the gate drivers 130.

A de-multiplexer (DEMUX) may be disposed between the data driver 110 and the data lines DL. The de-multiplexer is omitted from FIG. 1. The de-multiplexer sequentially connects one channel of the data driver 110 to the plurality of data lines DL and distributes in a time division manner the data voltage outputted from one channel of the data driver 110 to the data lines DL, thereby reducing the number of channels of the data driver 110.

The display panel driving circuit may further include a touch sensor driver for driving the touch sensors. The touch sensor driver is omitted from FIG. 1. In a mobile device, the timing controller 130, the power supply 140, the data driver 110, and the like may be integrated into one drive integrated circuit (IC).

The data driver 110 generates a data voltage Vdata by converting pixel data of an input image received from the timing controller 130 with a gamma compensation voltage every frame period by using a digital to analog converter (DAC). The gamma reference voltage VGMA is divided for respective gray scales through a voltage divider circuit. The gamma compensation voltage divided from the gamma reference voltage VGMA is provided to the DAC of the data driver 110. The data voltage Vdata is outputted through the output buffer in each of the channels of the data driver 110.

In the data driver 110, the output buffer included in one channel may be connected to adjacent data lines DL through the de-multiplexer array 112 (not shown). The de-multiplexer array 112 may be formed directly on the substrate of the display panel 100 or integrated into one drive IC together with the data driver 110.

The gate driver 120 may be implemented as a gate in panel (GIP) circuit formed directly on a bezel BZ area of the display panel 100 together with the TFT array of the pixel array AA. The gate driver 120 sequentially outputs gate signals to the gate lines GL under the control of the timing controller 130. The gate driver 120 may sequentially supply the gate signals to the gate lines GL by shifting the gate signals using a shift register.

The gate driver 120 may include a first gate driver 121 that outputs a scan signal and a second gate driver 122 that outputs a light emission signal, but is not limited to thereto.

The timing controller 130 receives, from a host system (not shown), digital video data DATA of an input image and a timing signal synchronized therewith. The timing signal includes a vertical synchronization signal Vsync, a horizontal synchronization signal Hsync, a main clock CLK, a data enable signal DE, and the like. Because a vertical period and a horizontal period can be known by counting the data enable signal DE, the vertical synchronization signal Vsync and the horizontal synchronization signal Hsync may be omitted. The data enable signal DE has a cycle of one horizontal period (1H).

The timing controller 130 multiplies an input frame frequency by i and controls the operation timing of the display panel driving circuit with a frame frequency of the input frame frequency×i (i is a positive integer greater than 0) Hz. The input frame frequency is 60 Hz in the NTSC (National Television Standards Committee) scheme and 50 Hz in the PAL (Phase-Alternating Line) scheme.

Based on the timing signals Vsync, Hsync, and DE received from the host system, the timing controller 130 generates a data timing control signal for controlling the operation timing of the data driver 110, MUX signals for controlling the operation timing of the de-multiplexer array 112, and a gate timing control signal for controlling the operation timing of the gate driver 120.

The voltage level of the gate timing control signal outputted from the timing controller 130 may be converted into the gate-on voltages VGH and VEH and the gate-off voltages VGL and VEL through a level shifter (not shown) and then supplied to the gate driver 120. That is, the level shifter converts a low-level voltage of the gate timing control signal into the gate-off voltages VGL and VEL and converts a high-level voltage of the gate timing control signal into the gate-on voltages VGH and VEH. The gate timing signal includes the start pulse and the shift clock.

The host system may include a main board of one of a television system, a set-top box, a navigation system, a personal computer (PC), a home theater system, a vehicle system, and a mobile device system. In this case, the data driver 110, the gate driver 120, the timing controller 130, and the like may be integrated into one drive IC (DIC) in mobile devices or wearable devices.

Figure 3:
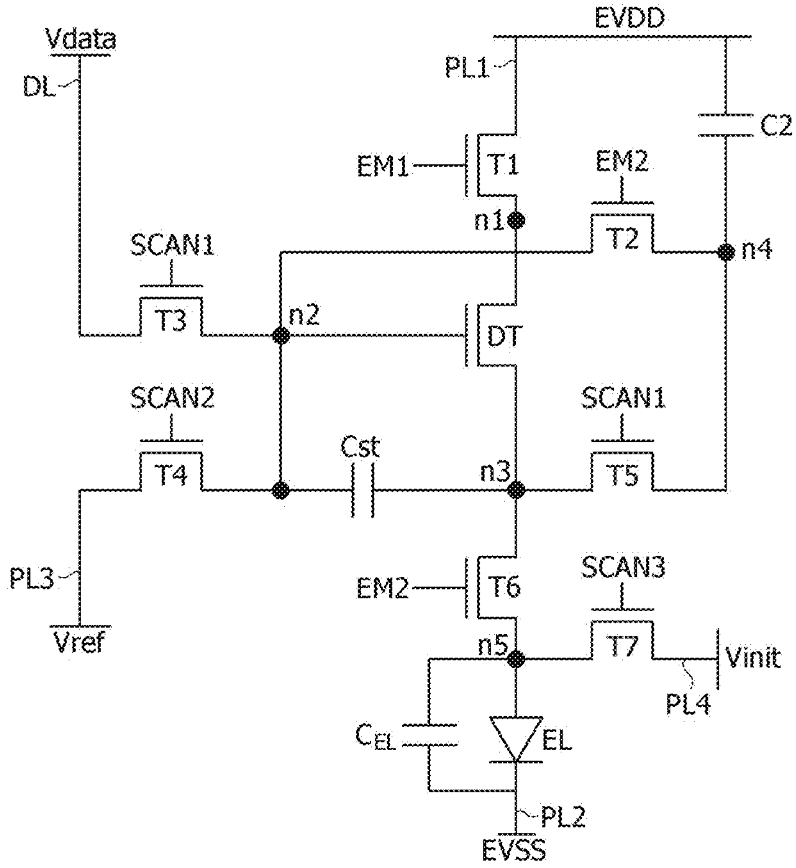
FIG. 3 is a diagram showing a pixel circuit according to a first embodiment of the present disclosure.
Figure 4:
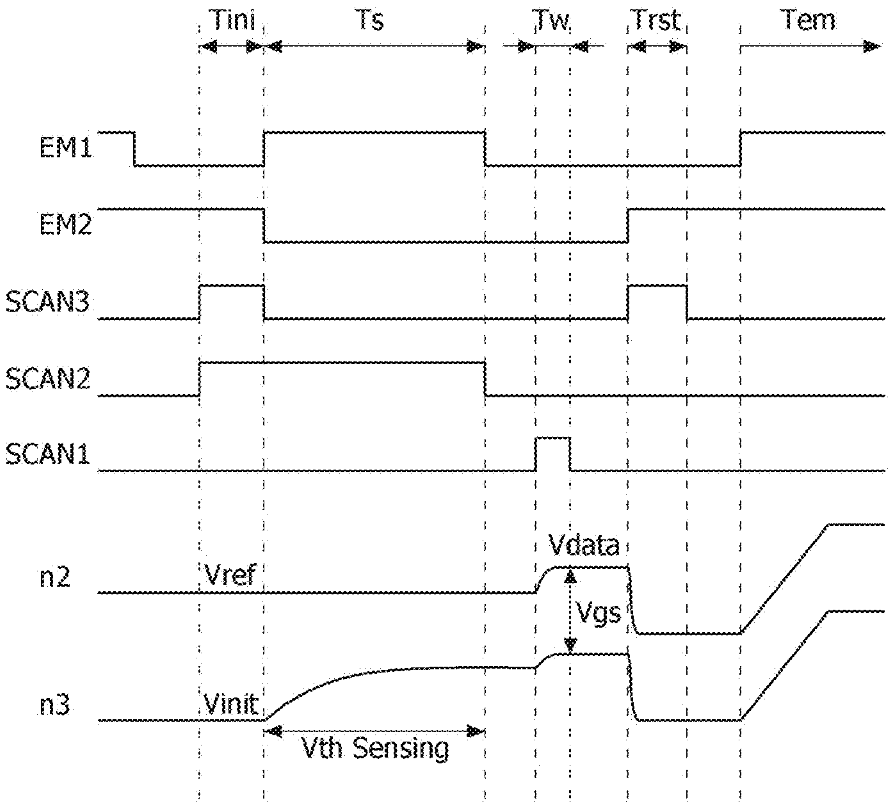
FIG. 4 is a diagram showing the driving timing of the pixel circuit shown in FIG. 3 according to the first embodiment of the present disclosure.

FIG. 3 is a diagram showing a pixel circuit according to a first embodiment of the present disclosure, FIG. 4 is a diagram showing the driving timing of the pixel circuit shown in FIG. 3 according to the first embodiment of the present disclosure, and FIGS. 5A to 5E are diagrams for explaining the operation of the pixel circuit of FIG. 4 according to the first embodiment of the present disclosure.

Referring to FIG. 3, the pixel circuit according to the first embodiment of the present disclosure includes a light-emitting element EL, a driving element DT for supplying current to the light-emitting element EL, a plurality of switch elements T1 to T7 for switching a current path connected to the driving element DT, a first capacitor Cst for storing the gate-source voltage of the driving element DT, and a second capacitor C2. The driving element DT and the switch elements T1 to T7 may be implemented as N-channel oxide TFTs, but are not limited to this.

The data voltage Vdata applied to the pixel circuit may be 4 to 12V, the pixel driving voltage EVDD may be 16V, the pixel base voltage EVSS may be 3V, the reference voltage Vref may be 4.3V, and the initialization voltage may be 0V.

The light-emitting element EL emits light by a current applied through a channel of the driving element DT according to the gate-source voltage Vgs of the driving element DT that varies depending on the data voltage Vdata. The light-emitting element EL may be implemented as an OLED including an organic compound layer formed between an anode and a cathode. The organic compound layer may include, but is not limited to, a hole injection layer (HIL), a hole transport layer (HTL), an emission layer (EML), an electron transport layer (ETL), and an electron injection layer (EIL). The anode of the light-emitting element EL is connected to the driving element DT through a third node n3, and the cathode of the light-emitting element EL is connected to a low-potential power supply voltage line PL2 to which the low-potential power supply voltage EVSS is applied.

The OLED used as the light-emitting element EL may have a tandem structure in which a plurality of light-emitting layers are stacked. The OLED with a tandem structure can improve the luminance and lifespan of pixels.

The driving element DT drives the light-emitting element EL by supplying current to the light-emitting element EL according to the gate-source voltage Vgs. The driving element DT includes a gate electrode connected to a second node n2, a first electrode (or drain) connected to a first node n1, and a second electrode (or source) connected to a third node n3.

The first switch element T1 is turned on according to the gate-on voltage of the first gate signal EM1 and supplies the pixel driving voltage EVDD to the driving element DT. The first switch element T1 includes a gate electrode to which the first gate signal EM1 is applied, a first electrode connected to a pixel driving voltage line or first power line PL1 to which the pixel driving voltage is applied, and a second electrode connected to the first electrode of the driving element.

The second switch element T2 is turned on according to the gate-on voltage of the second gate signal EM2 and connects a fourth node n4 to the second node n2. The second switch element T2 includes a gate electrode to which the second gate signal EM2 is applied, a first electrode connected to the second node n2, and a second electrode connected to the fourth node n4.

The third switch element T3 is turned on according to the gate-on voltage of the third gate signal SCAN1 and connects a data line DL to the second node n2 to apply the data voltage Vdata. The third switch element T3 includes a gate electrode to which the third gate signal SCAN1 is applied, a first electrode connected to the data line DL, and a second electrode connected to the second node n2.

The fourth switch element T4 is turned on according to the gate-on voltage of the fourth gate signal SCAN2 and connects a reference voltage line or third power line PL3 to the second node n2 to apply the reference voltage Vref. The fourth switch element T4 includes a gate electrode to which the fourth gate signal SCAN2 is applied, a first electrode connected to the third power line PL3, and a second electrode connected to the second node n2.

The fifth switch element T5 is turned on according to the gate-on voltage of the third gate signal SCAN1 and connects the third node n3 and the fourth node n4. The fifth switch element T4 includes a gate electrode to which the third gate signal SCAN1 is applied, a first electrode connected to the third node n3, and a second electrode connected to the fourth node n4.

The sixth switch element T6 is turned on according to the gate-on voltage of the second gate signal EM2 and connects the third node n3 and a fifth node n5. The sixth switch element T6 includes a gate electrode to which the second gate signal EM2 is applied, a first electrode connected to the third node n3, and a second electrode connected to the fifth node n5.

The seventh switch element T7 is turned on according to the gate-on voltage of the fifth gate signal SCAN3 and connects an initialization voltage line or fourth power line PL4 to the fifth node n5 to apply the initialization voltage. The seventh switch element T7 includes a gate electrode to which the fifth gate signal SCAN3 is applied, a first electrode connected to the fifth node n5, and a second electrode connected to the fourth power line PL4.

The first capacitor Cst may be connected between the second node n2 and the third node n3. The first capacitor Cst may charge the gate-source voltage Vgs of the driving element DT.

The second capacitor C2 may be connected between the fourth node n4 and the first power line PL1.

At this time, the second capacitor C2 is needed to write the data voltage. The reason is as follows. When the fifth switch element T5 is turned on after sensing of the threshold voltage Vth of the driving element DT, the voltage of the first node n1 changes from the reference voltage to the data voltage and thus the data voltage is written. At this time, if the second node is in a floating state and there is no second capacitor C2, the voltage change in the first node is directly transmitted to the second node. That is, the voltage of the second node changes from Vref−Vth to Vref−Vth+(Vdata−Vref), so that Vgs=Vth and thus the data voltage disappears. Therefore, the second capacitor C2 serves to suppress the voltage change of the second node n2 so that the data voltage Vdata remains at Vgs.

Referring to FIG. 4, the pixel circuit according to the first embodiment of the present disclosure may be driven in the order of an initialization step Tini, a sensing step Ts, a data writing step Tw, a reset step Trst, and a light emission step Tem.

Figure 5A:
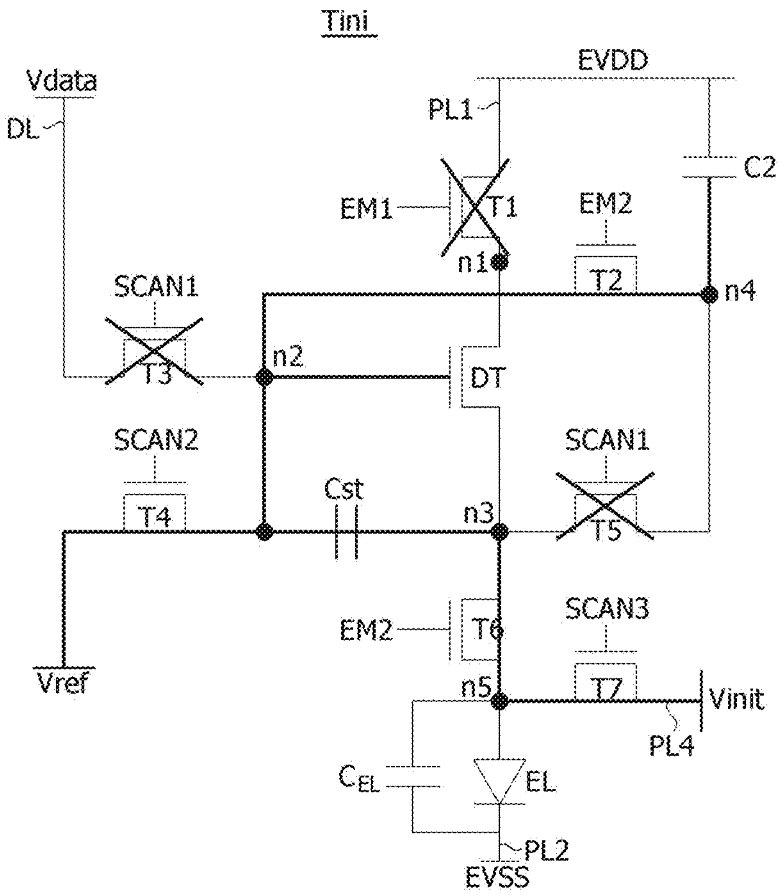
FIGS. 5A to 5E are diagrams for explaining the operation of the pixel circuit of FIG. 4 according to the first embodiment of the present disclosure.

Referring to FIGS. 4 and 5A, in the initialization step Tini, the first switch element T1, the third switch element T3, and the fifth switch element T5 are turned off, and the second switch element T2, the fourth switch element T4, and the sixth and seventh switch elements T6 and T7 are turned on, so that the reference voltage Vref is applied to the second node n2 for initialization, and the initialization voltage Vinit is applied to the node n3 for initialization. Accordingly, the voltage of the second node n2 becomes Vref, and the voltage of the third node n3 becomes Vinit.

Figure 5B:
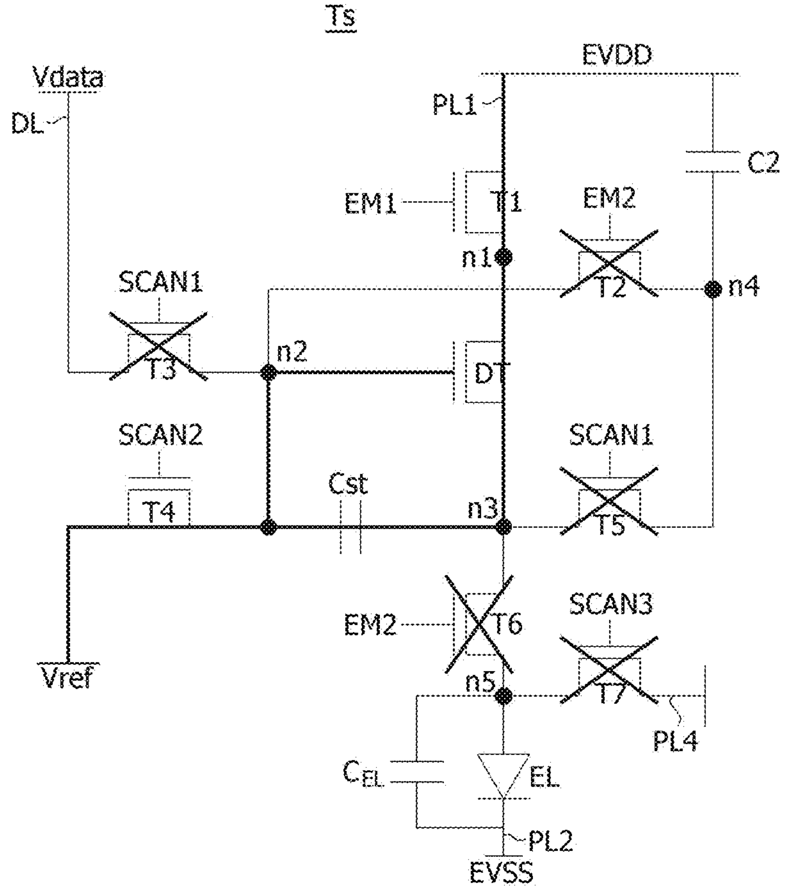

Referring to FIGS. 4 and 5B, in the sensing step Ts, the second and third switch elements T2 and T3 and the fifth to seventh switch elements T5 to T7 are turned off, and the first switch element T1 and the fourth switch element T4 are turned on, so that the threshold voltage Vth of the driving element DT is sensed and stored in the first capacitor Cst. Accordingly, the voltage of the third node n3 becomes Vinit−Vth.

Figure 5C:
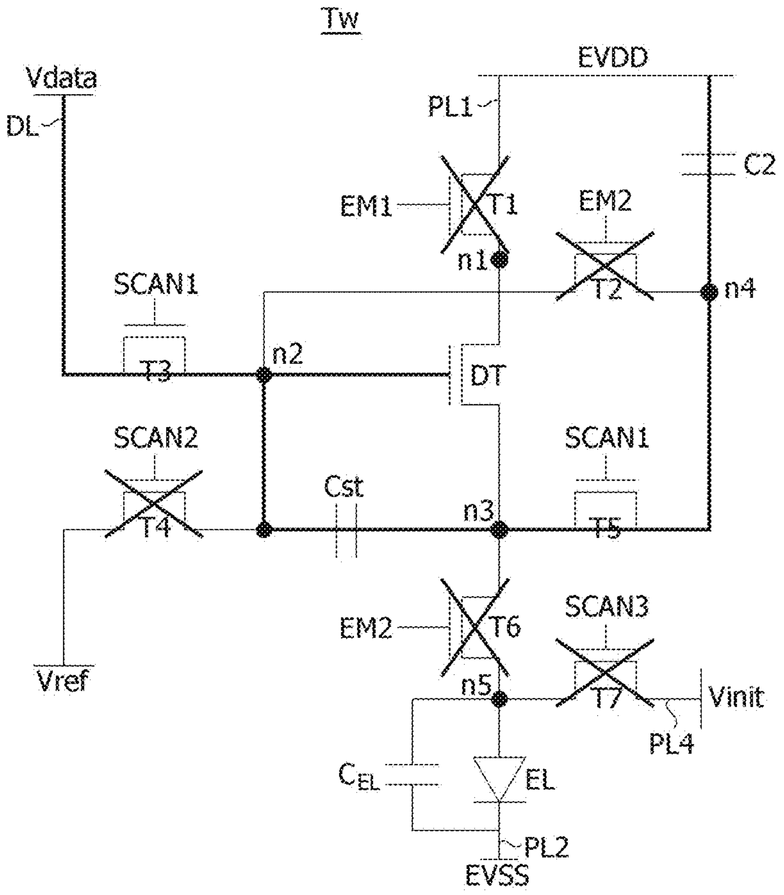

Referring to FIGS. 4 and 5C, in the data writing step Tw, the first and second switch elements T1 and T2, the fourth switch element T4, and the sixth and seventh switch elements T6 and T7 are turned off, the third switch element T3 and the fifth switch element T5 are turned on, so that the data voltage Vdata of pixel data is applied to the second node n2. Accordingly, the voltage of the second node n2 changes from Vref to Vdata. At this time, a change equal to the ratio Cst/(Cst+C2) of the voltage change of the second node n2 is added to the third node n3.

Figure 5D:
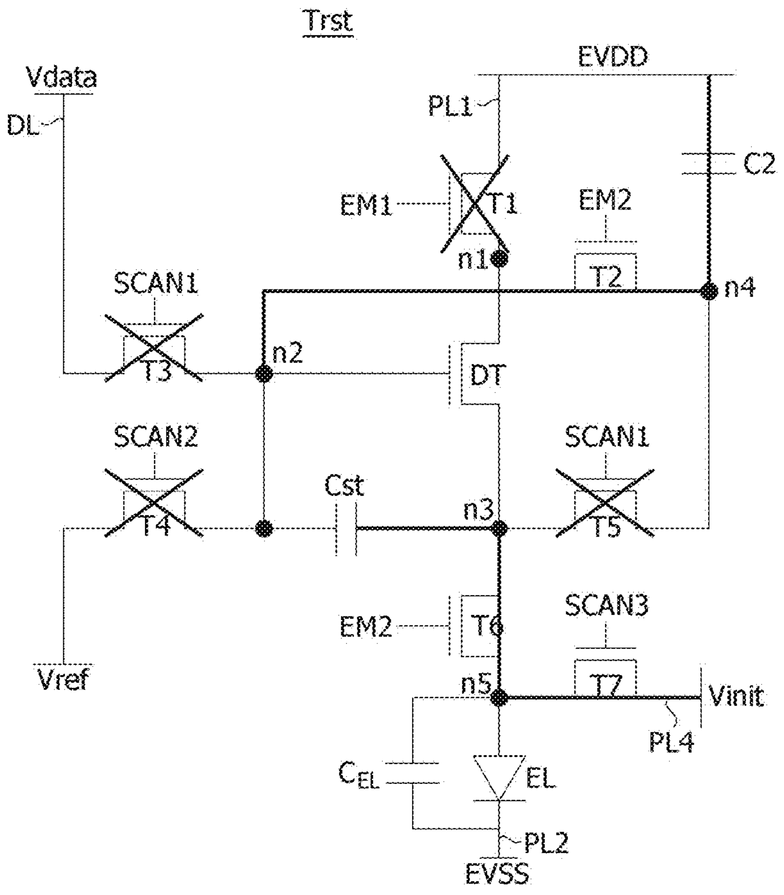

Referring to FIGS. 4 and 5D, in the reset step Trst, the first switch element T1 and the third to fifth switch elements T3 to T5 are turned off, the second switch element T2 and the sixth and seventh switch elements T6 and T7 are turned on, so that the initialization voltage Vinit is applied to the third node n3. Accordingly, the voltage of the third node n3 becomes Vinit.

Figure 5E:
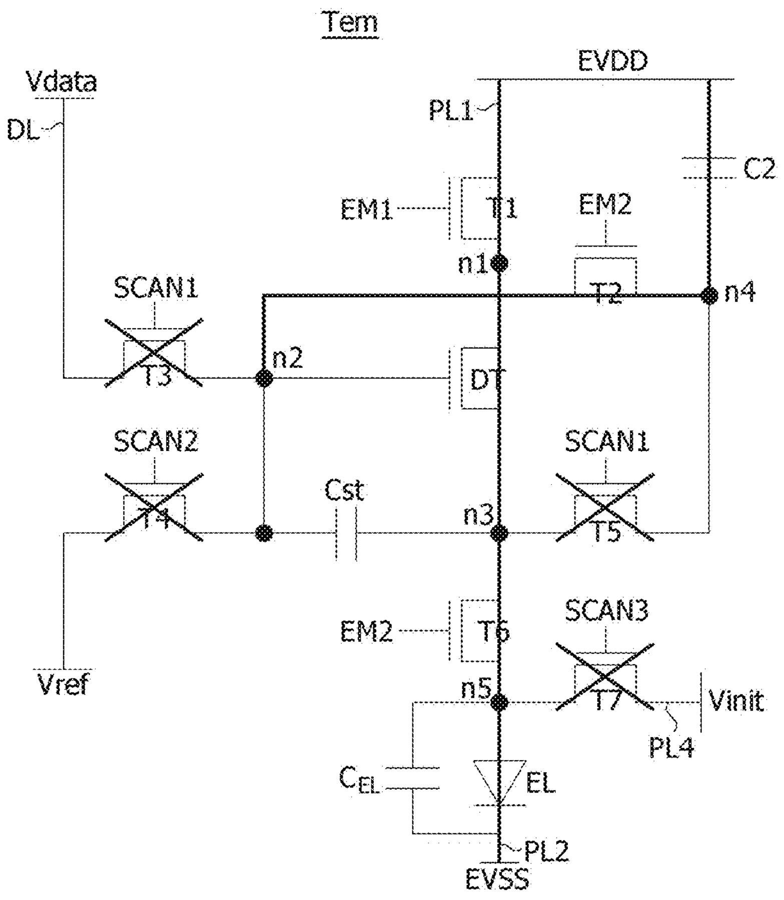

Referring to FIGS. 4 and 5E, in the light emission step Tem, the third to fifth switch elements T3 to T5 and the seventh switch element T7 are turned off, and the first and second switch elements T1 and T2 and the sixth switch element T6 are turned on, so that the voltages of the second and third nodes n2 and n3 increase, and then the light-emitting element EL may emit light at a luminance corresponding to the gray scale value of the pixel data.

At this time, during boosting, the second capacitor C2 is connected to the second node n2. Due to the voltage distribution effect by the second capacitor C2, the voltage increase of the second node n2 is delayed compared to the voltage increase of the third node n3. Therefore, Vgs decreases and thus luminance decreases. In high gray scales, the boosting speed is very fast, so the Vgs reduction effect by the second capacitor C2 is small, but in low gray scales, the Vgs reduction effect is relatively large, making it possible to improve gamma characteristics.

Figure 6:
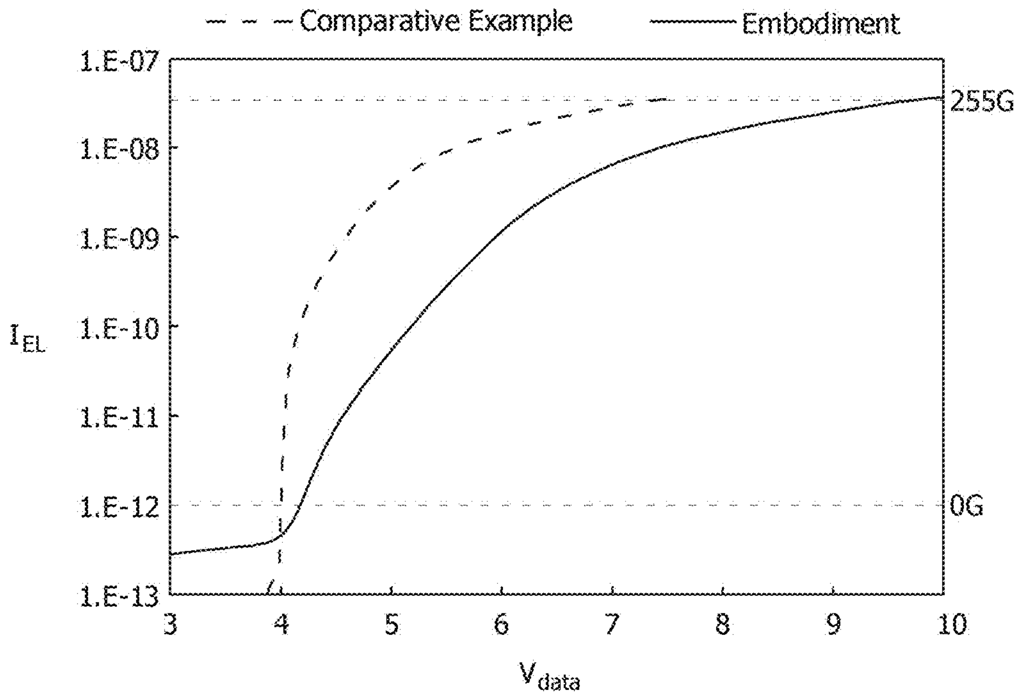
FIG. 6 is a diagram showing a gamma curve generated by the pixel circuit of FIG. 3 according to the first embodiment of the present disclosure.

FIG. 6 is a diagram showing a gamma curve generated by the pixel circuit of FIG. 3 according to the first embodiment of the present disclosure.

Referring to FIG. 6, it may be seen that the embodiment of the pixel circuit in which two switch elements are additionally configured to selectively connect the second capacitor to the gate electrode and the source electrode of the driving element has a reduced slope of the gamma curve at low gray scales compared to the pixel circuit of a comparative example.

If the slope of the gamma curve is reduced at low gray scales, it may facilitate the low gray scale expression.

Figure 7:
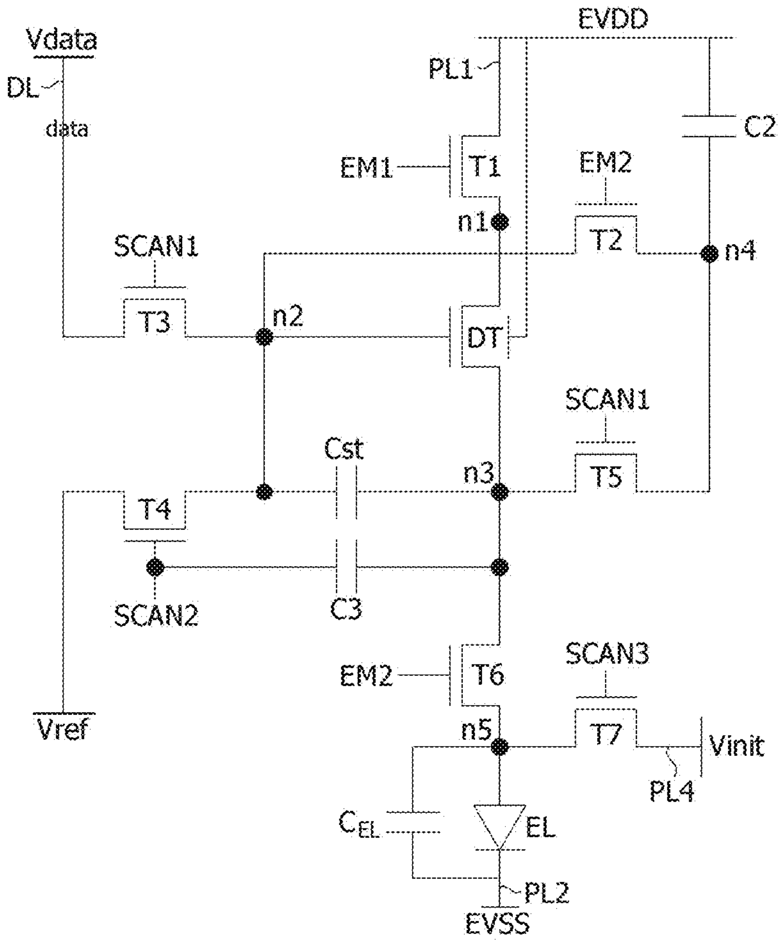
FIG. 7 is a diagram showing a pixel circuit according to a second embodiment of the present disclosure.
Figure 8:
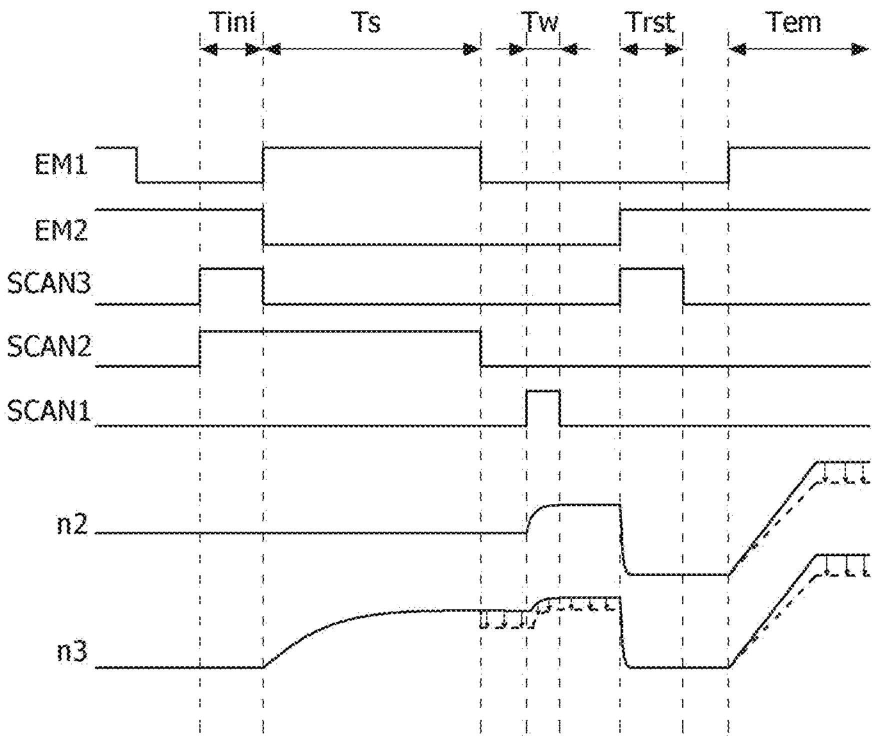
FIG. 8 is a diagram showing the driving timing of the pixel circuit shown in FIG. 7 according to the second embodiment of the present disclosure.

FIG. 7 is a diagram showing a pixel circuit according to a second embodiment of the present disclosure, FIG. 8 is a diagram showing the driving timing of the pixel circuit shown in FIG. 7 according to the second embodiment of the present disclosure, and FIGS. 9A to 9E are diagrams for explaining the operation of the pixel circuit of FIG. 7 according to the second embodiment of the present disclosure.

Referring to FIG. 7, the pixel circuit according to the second embodiment of the present disclosure includes a light-emitting element EL, a driving element DT for supplying current to the light-emitting element EL, a plurality of switch elements T1 to T7 for switching a current path connected to the driving element DT, a first capacitor Cst for storing the gate-source voltage of the driving element DT, a second capacitor C2, and a third capacitor C3. The driving element DT and the switch elements T1 to T7 may be implemented as N-channel oxide TFTs, but are not limited to this.

The light-emitting element EL emits light by a current applied through a channel of the driving element DT according to the gate-source voltage Vgs of the driving element DT that varies depending on the data voltage Vdata. The light-emitting element EL may be implemented as an OLED including an organic compound layer formed between an anode and a cathode. The organic compound layer may include, but is not limited to, a hole injection layer (HIL), a hole transport layer (HTL), an emission layer (EML), an electron transport layer (ETL), and an electron injection layer (EIL). The anode of the light-emitting element EL is connected to the driving element DT through a third node n3, and the cathode of the light-emitting element EL is connected to a low-potential power supply voltage line PL2 to which the low-potential power supply voltage EVSS is applied.

The OLED used as the light-emitting element EL may have a tandem structure in which a plurality of light-emitting layers are stacked. The OLED with a tandem structure can improve the luminance and lifespan of pixels.

The driving element DT drives the light-emitting element EL by supplying current to the light-emitting element EL according to the gate-source voltage Vgs. The driving element DT may be a MOSFET with a double gate structure. The driving element DT includes a first gate electrode connected to a second node n2, a second gate electrode connected to a pixel driving voltage line or first power line PL1 to which the pixel driving voltage is applied, a first electrode (or drain) connected to a first node n1, and a second electrode (or source) connected to a third node n3.

At this time, using the driving element DT with the dual gate structure makes it possible to reduce the data voltage for high luminance output and thereby reduce power consumption, but may increase mobility. As mobility increases, the data voltage for high luminance output decreases, thus reducing power consumption, the stress on the driving element DT decreases, thus increasing device lifespan and reliability, and the time required for threshold voltage sensing decreases, which is advantageous for higher resolution and high refresh rate driving. However, the gamma curve changes rapidly, reducing the data voltage range at low gray scales and reducing the accuracy of low gray scale expression.

To solve this problem, the embodiment is intended to add the third capacitor C3.

The first switch element T1 is turned on according to the gate-on voltage of the first gate signal EM1 and supplies the pixel driving voltage EVDD to the driving element DT. The first switch element T1 includes a gate electrode to which the first gate signal EM1 is applied, a first electrode connected to a pixel driving voltage line or first power line PL1 to which the pixel driving voltage is applied, and a second electrode connected to the first electrode of the driving element.

The second switch element T2 is turned on according to the gate-on voltage of the second gate signal EM2 and connects a fourth node n4 to the second node n2. The second switch element T2 includes a gate electrode to which the second gate signal EM2 is applied, a first electrode connected to the second node n2, and a second electrode connected to the fourth node n4.

The third switch element T3 is turned on according to the gate-on voltage of the third gate signal SCAN1 and connects a data line DL to the second node n2 to apply the data voltage Vdata. The third switch element T3 includes a gate electrode to which the third gate signal SCAN1 is applied, a first electrode connected to the data line DL, and a second electrode connected to the second node n2.

The fourth switch element T4 is turned on according to the gate-on voltage of the fourth gate signal SCAN2 and connects a reference voltage line or third power line PL3 to the second node n2 to apply the reference voltage Vref. The fourth switch element T4 includes a gate electrode to which the fourth gate signal SCAN2 is applied, a first electrode connected to the third power line PL3, and a second electrode connected to the second node n2.

The fifth switch element T5 is turned on according to the gate-on voltage of the third gate signal SCAN1 and connects the third node n3 and the fourth node n4. The fifth switch element T4 includes a gate electrode to which the third gate signal SCAN1 is applied, a first electrode connected to the third node n3, and a second electrode connected to the fourth node n4.

The sixth switch element T6 is turned on according to the gate-on voltage of the second gate signal EM2 and connects the third node n3 and a fifth node n5. The sixth switch element T6 includes a gate electrode to which the second gate signal EM2 is applied, a first electrode connected to the third node n3, and a second electrode connected to the fifth node n5.

The seventh switch element T7 is turned on according to the gate-on voltage of the fifth gate signal SCAN3 and connects an initialization voltage line or fourth power line PL4 to the fifth node n5 to apply the initialization voltage. The seventh switch element T7 includes a gate electrode to which the fifth gate signal SCAN3 is applied, a first electrode connected to the fifth node n5, and a second electrode connected to the fourth power line PL4.

The first capacitor Cst may be connected between the second node n2 and the third node n3. The first capacitor Cst may charge the gate-source voltage Vgs of the driving element DT.

The second capacitor C2 may be connected between the fourth node n4 and the first power line PL1.

The third capacitor C3 is connected between the gate electrode of the fourth switch element T4 and the third node n3.

The third capacitor C3 can shift the data voltage range without changing gamma characteristics, thereby lowering the data voltage for high luminance output, improving power consumption, and enhancing device lifespan.

Referring to FIG. 8, the pixel circuit according to the second embodiment of the present disclosure may be driven in the order of an initialization step Tini, a sensing step Ts, a data writing step Tw, a reset step Trst, and a light emission step Tem.

Figure 9A:
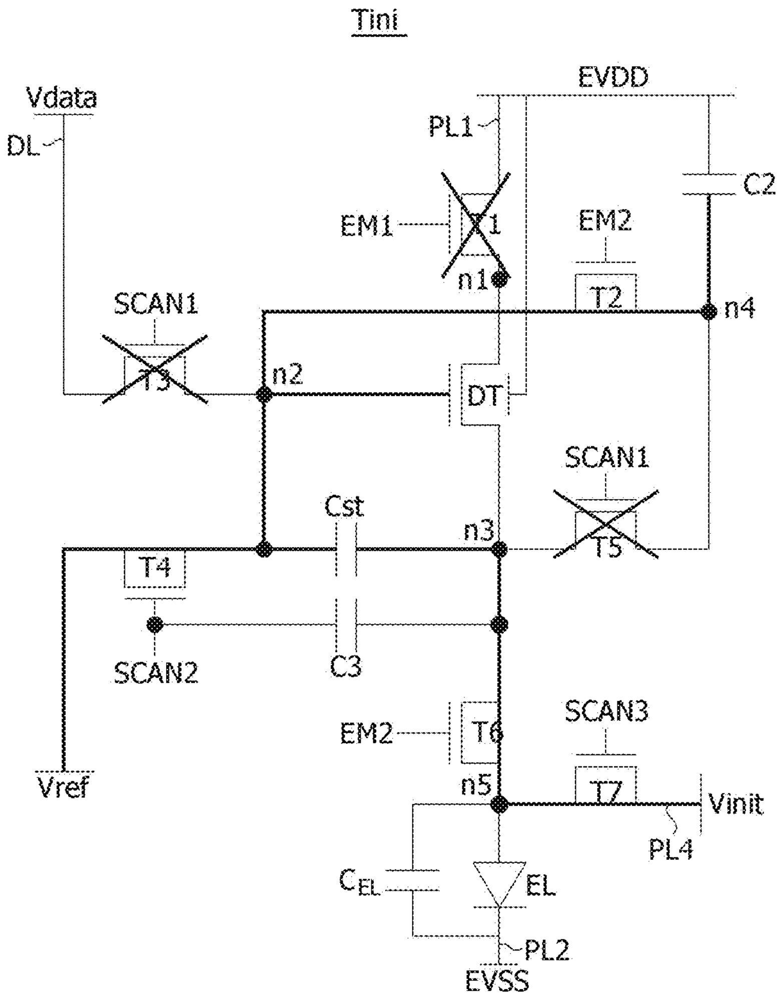
FIGS. 9A to 9E are diagrams for explaining the operation of the pixel circuit of FIG. 7 according to the second embodiment of the present disclosure.

Referring to FIGS. 8 and 9A, in the initialization step Tini, the first switch element T1, the third switch element T3, and the fifth switch element T5 are turned off, and the second switch element T2, the fourth switch element T4, and the sixth and seventh switch elements T6 and T7 are turned on, so that the reference voltage Vref is applied to the second node n2, and the initialization voltage Vinit is applied to the third node n3. Accordingly, the voltage of the second node n2 becomes Vref, and the voltage of the third node n3 becomes Vinit.

Figure 9B:
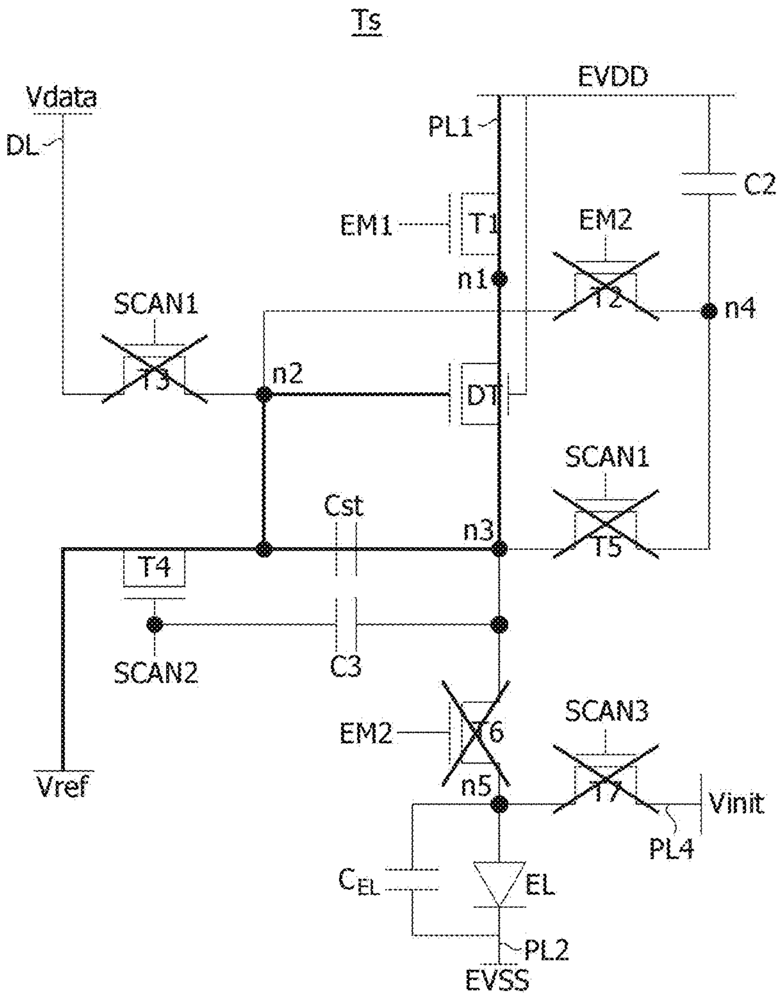

Referring to FIGS. 8 and 9B, in the sensing step Ts, the second and third switch elements T2 and T3 and the fifth to seventh switch elements T5 to T7 are turned off, and the first switch element T1 and the fourth switch element T4 are turned on, so that the threshold voltage Vth of the driving element DT is sensed and stored in the first capacitor Cst. Accordingly, the voltage of the third node n3 becomes Vinit−Vth.

At this time, upon polling of the fourth gate signal SCAN2, the kick-back effect is delivered to the third node n3 through the third capacitor C3, so that the voltage of the third node n3 decreases and Vgs increases.

Figure 9C:
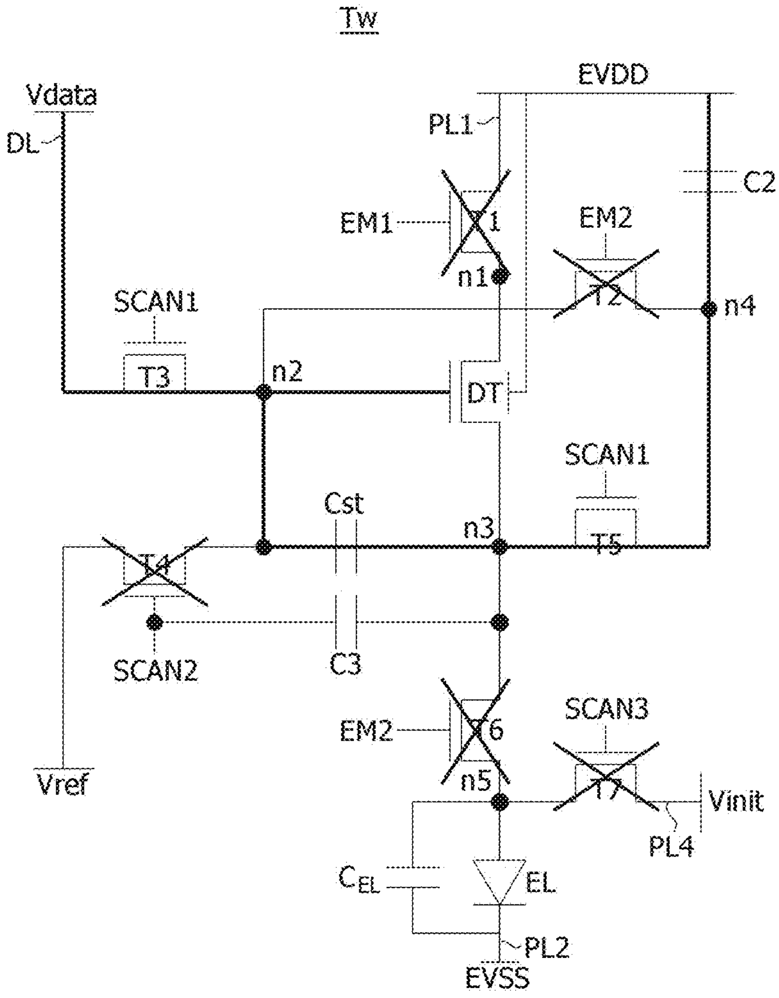

Referring to FIGS. 8 and 9C, in the data writing step Tw, the first and second switch elements T1 and T2, the fourth switch element T4, and the sixth and seventh switch elements T6 and T7 are turned off, the third switch element T3 and the fifth switch element T5 are turned on, so that the data voltage Vdata of pixel data is applied to the second node n2. Accordingly, the voltage of the second node n2 changes from Vref to Vdata. At this time, a change equal to the ratio Cst/(Cst+C2) of the voltage change of the second node n2 is added to the third node n3.

Figure 9D:
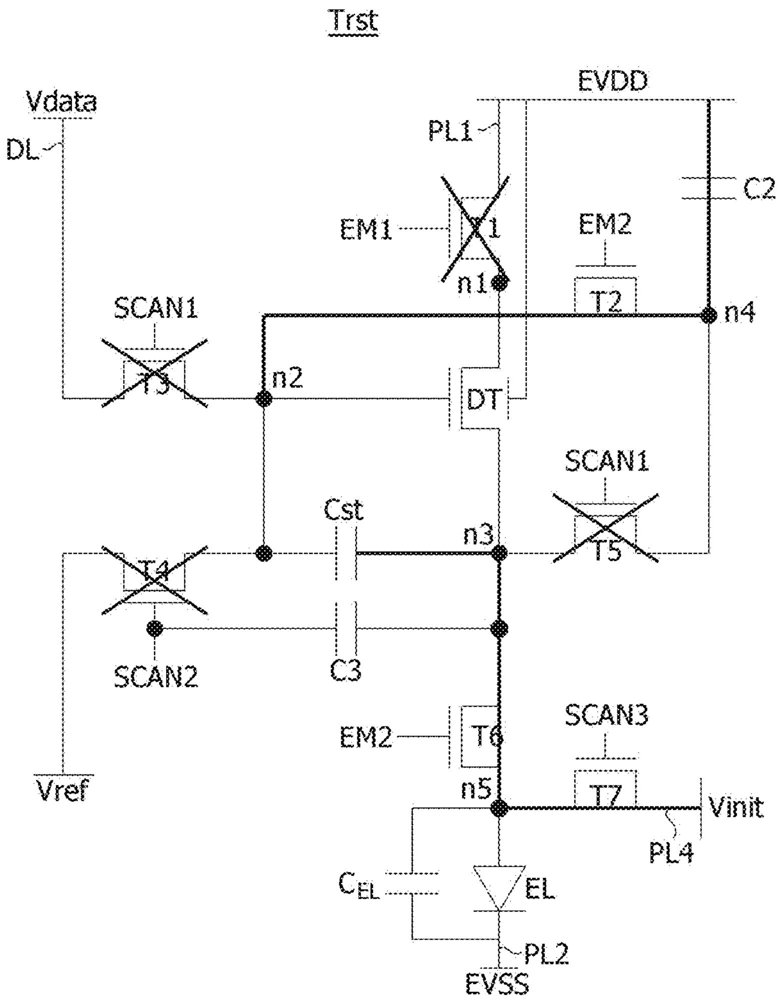

Referring to FIGS. 8 and 9D, in the reset step Trst, the first switch element T1 and the third to fifth switch elements T3 to T5 are turned off, the second switch element T2 and the sixth and seventh switch elements T6 and T7 are turned on, so that the initialization voltage Vinit is applied to the third node n3. Accordingly, the voltage of the third node n3 becomes Vinit.

Figure 9E:
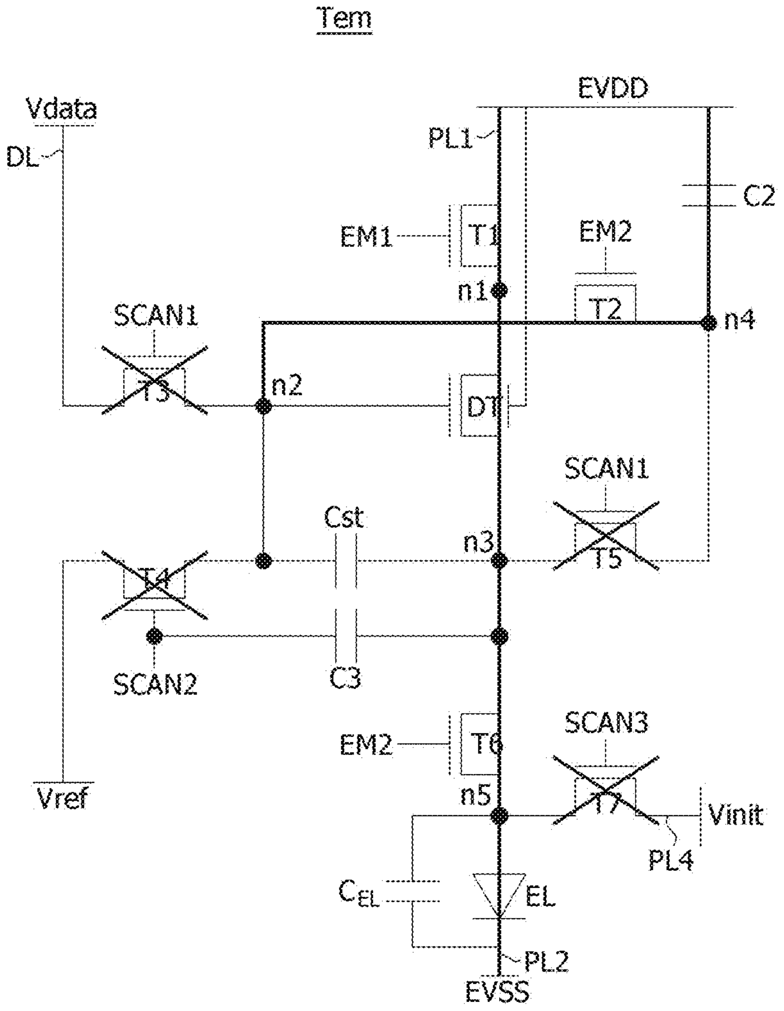

Referring to FIGS. 8 and 9E, in the light emission step Tem, the third to fifth switch elements T3 to T5 and the seventh switch element T7 are turned off, and the first and second switch elements T1 and T2 and the sixth switch element T6 are turned on, so that the voltages of the second and third nodes n2 and n3 increase, and then the light-emitting element EL may emit light at a luminance corresponding to the gray scale value of the pixel data.

Figure 10A:
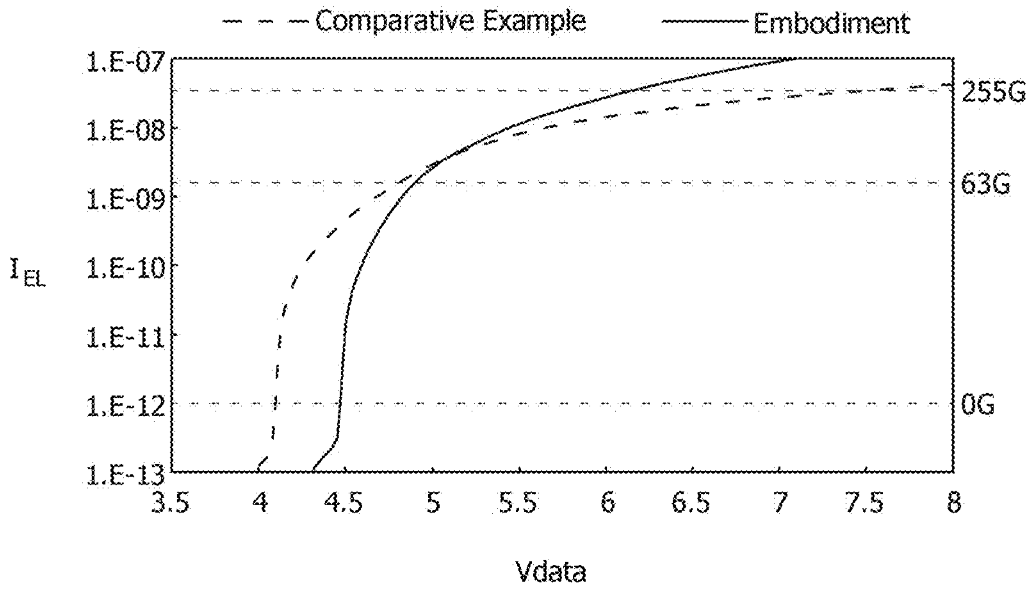
FIGS. 10A and 10B are diagrams showing gamma curves generated by the pixel circuit of FIG. 7 according to the second embodiment of the present disclosure.
Figure 10B:
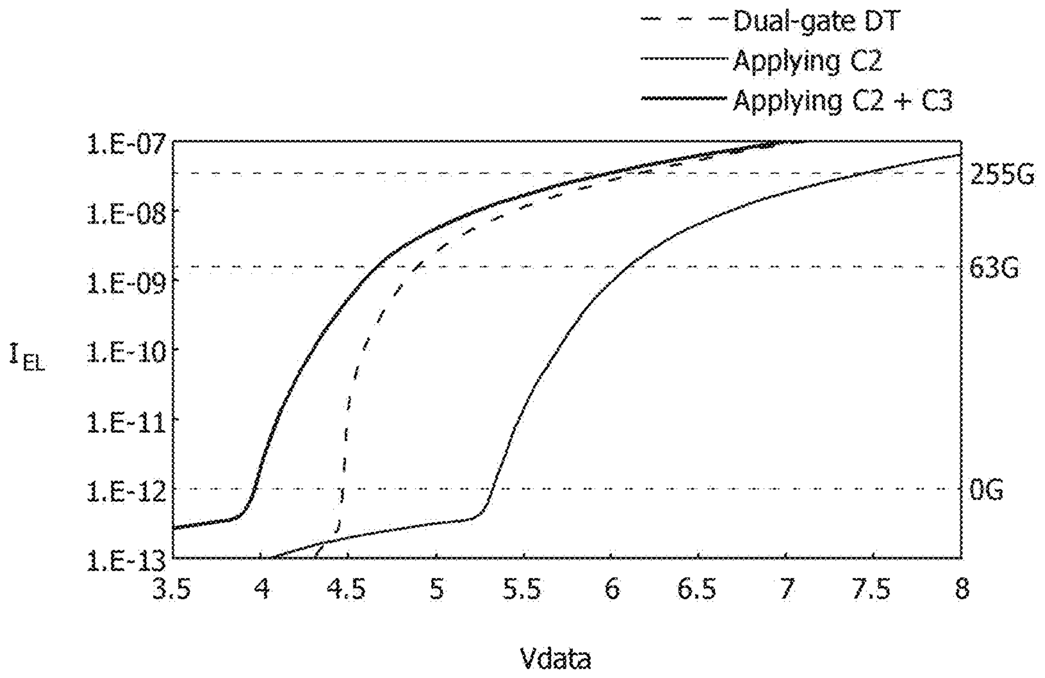

FIGS. 10A and 10B are diagrams showing gamma curves generated by the pixel circuit of FIG. 7 according to the second embodiment of the present disclosure.

Referring to FIG. 10A, it may be seen that compared to the comparative example of the pixel circuit using the driving element with the single gate structure, in the embodiment of the pixel circuit using the driving element with the double gate structure, the data voltage for high gray scale expression is lowered from approximately 7.45 V to 6.5 V, and the data voltage for low gray scale expression is significantly lowered from approximately 0.7 V to 0.4 V.

Referring to FIG. 10B, when only the second capacitor C2 is added to the embodiment of the pixel circuit using the driving element with the double gate structure, the data voltage range for low gray scale expression is 0.75 V, which is equivalent to the comparative example of FIG. 10A, but the data voltage range of all gray scales increases by approximately 1V. It may be seen that when both the second capacitor C2 and the third capacitor C3 are added, the data voltage range of the entire gray scale is lowered.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit, comprising:

a driving element including a first electrode connected to a first node of the pixel circuit, a gate electrode connected to a second node of the pixel circuit, and a second electrode connected to a third node of the pixel circuit;

a first switch element supplying a pixel driving voltage to the first node in response to a first gate signal;

a second switch element connecting a fourth node of the pixel circuit to the second node in response to a second gate signal;

a third switch element supplying a data voltage to the second node in response to a third gate signal;

a fourth switch element supplying a reference voltage to the second node in response to a fourth gate signal;

a fifth switch element connecting the fourth node to the third node in response to the third gate signal;

a first capacitor including a first electrode connected to the gate electrode of the driving element and the first electrode of the second switch element at the second node and a second electrode connected to the second electrode of the driving element and the first electrode of the fifth switch element at the third node;

a second capacitor including a first electrode connected to a first power line of the pixel circuit and a second electrode connected to the second electrode of the second switch element and the second electrode of the fifth switch element at the fourth node; and a light-emitting element connected to the third node and a second power line of the pixel circuit.

2. The pixel circuit of claim 1, further comprising:

a sixth switch element connecting the third node to a fifth node of the pixel circuit, wherein an anode electrode of the light-emitting element is connected to the fifth node in response to the second gate signal; and a seventh switch element applying an initialization voltage to the fifth node in response to a fifth gate signal.

3. The pixel circuit of claim 2, wherein the pixel circuit is driven in an order of an initialization step, a sensing step, a data writing step, a reset step, and a light emission step, and wherein, in the sensing step, the first switch element and the fourth switch element are turned on.

4. The pixel circuit of claim 3, wherein, in the light emission step, the first switch element, the second switch element and the sixth switch element are turned on.

5. The pixel circuit of claim 3, wherein the first switch element includes a gate electrode to which the first gate signal is applied, a first electrode connected to the first power line to which the pixel driving voltage is applied, and a second electrode connected to the first node, the second switch element includes a gate electrode to which the second gate signal is applied, a first electrode connected to the second node, and a second electrode connected to the fourth node, the third switch element includes a gate electrode to which the third gate signal is applied, a first electrode connected to a data line to which the data voltage is applied, and a second electrode connected to the second node, the fourth switch element includes a gate electrode to which the fourth gate signal is applied, a first electrode connected to a reference voltage line to which the reference voltage is applied, and a second electrode connected to the second node, and the fifth switch element includes a gate electrode to which the third gate signal is applied, a first electrode connected to the third node, and a second electrode connected to the fourth node.

6. The pixel circuit of claim 5, wherein the sixth switch element includes a gate electrode to which the second gate signal is applied, a first electrode connected to the third node, and a second electrode connected to the fifth node, and the seventh switch element includes a gate electrode to which the fifth gate signal is applied, a first electrode connected to the fifth node, and a second electrode connected to an initialization voltage line to which the initialization voltage is applied.

7. The pixel circuit of claim 2, wherein the gate electrode of the driving element includes a first gate electrode connected to the first node and a second gate electrode connected to the first power line.

8. The pixel circuit of claim 7, further comprising:

a third capacitor connected to a gate electrode of the fourth switch element and the third node.

9. A display device, comprising:

a display panel including a plurality of data lines, a plurality of gate lines that cross the plurality of data lines, and a plurality of pixel circuits, each of the plurality of pixel circuits including:

a driving element including a first electrode connected to a first node, a gate electrode connected to a second node, and a second electrode connected to a third node;

a first switch element supplying a pixel driving voltage to the first node in response to a first gate signal;

a second switch element connecting a fourth node to the second node in response to a second gate signal;

a third switch element supplying a data voltage to the second node in response to a third gate signal;

a fourth switch element supplying a reference voltage to the second node in response to a fourth gate signal;

a fifth switch element connecting the fourth node to the third node in response to the third gate signal;

a first capacitor including a first electrode connected to the gate electrode of the driving element and the first electrode of the second switch element at the second node and a second electrode connected to the second electrode of the driving element and the first electrode of the fifth switch element at the third node;

a second capacitor including a first electrode connected to a first power line and a second electrode connected to the second electrode of the second switch element and the second electrode of the fifth switch element at the fourth node; and a light-emitting element connected to the third node and a second power line.

10. The display device of claim 9, wherein each of the plurality of pixel circuits further includes:

a sixth switch element connecting the third node to a fifth node, an anode electrode of the light-emitting element connected to the fifth node in response to the second gate signal; and a seventh switch element applying an initialization voltage to the fifth node in response to a fifth gate signal.

11. The display device of claim 10, wherein each of the plurality of pixel circuits is driven in an order of an initialization step, a sensing step, a data writing step, a reset step, and a light emission step, and wherein, in the sensing step, the first switch element and the fourth switch element are turned on.

12. The display device of claim 11, wherein, in the light emission step, the first switch element, the second switch element and the sixth switch element are turned on.

13. The display device of claim 11, wherein the first switch element includes a gate electrode to which the first gate signal is applied, a first electrode connected to the first power line to which the pixel driving voltage is applied, and a second electrode connected to the first node, the second switch element includes a gate electrode to which the second gate signal is applied, a first electrode connected to the second node, and a second electrode connected to the fourth node, the third switch element includes a gate electrode to which the third gate signal is applied, a first electrode connected to a data line to which the data voltage is applied, and a second electrode connected to the second node, the fourth switch element includes a gate electrode to which the fourth gate signal is applied, a first electrode connected to a reference voltage line to which the reference voltage is applied, and a second electrode connected to the second node, and the fifth switch element includes a gate electrode to which the third gate signal is applied, a first electrode connected to the third node, and a second electrode connected to the fourth node.

14. The display device of claim 13, wherein the sixth switch element includes a gate electrode to which the second gate signal is applied, a first electrode connected to the third node, and a second electrode connected to the fifth node, and the seventh switch element includes a gate electrode to which the fifth gate signal is applied, a first electrode connected to the fifth node, and a second electrode connected to an initialization voltage line to which the initialization voltage is applied.

15. The display device of claim 10, wherein the gate electrode of the driving element includes a first gate electrode connected to the first node and a second gate electrode connected to the first power line.

16. The display device of claim 15, wherein each of the plurality of pixel circuits further includes:

a third capacitor connected to a gate electrode of the fourth switch element and the third node.

* * * * *